United States Patent [19]

Bolvari

[11] Patent Number: 5,683,818
[45] Date of Patent: Nov. 4, 1997

US005683818A

[54] METHOD FOR IMPROVING THE FRICTION AND WEAR PROPERTIES OF A POLYAMIDE AND POLYPROYPLENE BLEND

[75] Inventor: Anne E. Bolvari, West Chester, Pa.

[73] Assignee: Kawasaki Chemical Holding Co., Inc., Wilmington, Del.

[21] Appl. No.: 425,704

[22] Filed: Apr. 20, 1995

Related U.S. Application Data

[63] Continuation of Ser. No. 56,727, May 4, 1993, abandoned.

[51] Int. Cl.⁶ .................................................. C08L 77/00
[52] U.S. Cl. ........................... 428/475.5; 428/474.4; 525/66
[58] Field of Search ................... 525/66; 428/474.4, 428/475.5

[56] References Cited

U.S. PATENT DOCUMENTS

| | | | |
|---|---|---|---|
| 4,305,865 | 12/1981 | Okada et al. | 524/423 |
| 4,391,951 | 7/1983 | Sheetz | 525/166 |
| 4,780,505 | 10/1988 | Mashita et al. | 525/66 |
| 4,912,150 | 3/1990 | Ushiroji et al. | 524/504 |
| 4,945,126 | 7/1990 | Crosby et al. | 524/507 |
| 5,006,601 | 4/1991 | Lutz et al. | 525/66 |
| 5,013,789 | 5/1991 | Sakuma et al. | 525/66 |
| 5,140,059 | 8/1992 | Simoens | 524/504 |
| 5,147,931 | 9/1992 | Sakuma et al. | 525/66 |
| 5,162,422 | 11/1992 | Lausberg et al. | 524/504 |
| 5,234,993 | 8/1993 | Huynh-Ba | 525/66 |

FOREIGN PATENT DOCUMENTS

| | | | |
|---|---|---|---|
| 3804161 | 8/1989 | Germany. | |
| 59-149940 | 8/1984 | Japan. | |
| 62-158739 | 7/1987 | Japan | 525/179 |
| 1403797 | 8/1975 | United Kingdom. | |
| WO88-006174 | 8/1988 | WIPO | 525/66 |

*Primary Examiner*—Ana Woodward
*Attorney, Agent, or Firm*—Panitch Schwarze Jacobs & Nadel, P.C.

[57] ABSTRACT

The present invention provides a method of improving the wear resistance of a polymeric composite comprising a polyamide and a polypropylene. The polymeric composite is a component of a tribological wear system in which a surface of the polymeric composite bears against another surface causing friction and wear of the polymeric composite. By the present method, at least one crystalline polymer is functionalized to graft with at least one of the polyamide and the polypropylene to form the composite.

9 Claims, No Drawings

METHOD FOR IMPROVING THE FRICTION AND WEAR PROPERTIES OF A POLYAMIDE AND POLYPROYPLENE BLEND

This is a continuation of U.S. patent application Ser. No. 08/056,727, filed May 4, 1993 now abandoned.

FIELD OF THE INVENTION

The invention relates to a polymeric blend composition for use in a tribological wear system and, more particularly, to enhancing the friction and wear properties of a polyamide and polypropylene blend.

BACKGROUND OF THE INVENTION

Traditional wear systems use external lubricants, such as oil or grease, to increase the wear resistance and reduce frictional losses between moving contacting components. However, such external lubricants often must be replaced periodically and may be unevenly distributed over the wear surface, resulting in increased cost and inefficiency of the wear system. In addition, traditional external lubricants are not desirable, for example, in the areas of food processing or photocopying where product contamination is a concern.

The need for external lubricants may be reduced or eliminated by the use of polymeric contacting components. Polymeric components may be easily and inexpensively manufactured by such processes as injection molding to form intricately shaped components such as gears, cams, bearings, slides, ratchets, pumps, electrical contacts and prostheses.

Polymeric contacting components provide an economical and essentially maintenance-free alternative to typical prior art non-polymeric contacting components. Components formed from polymeric compounds have greater shock and vibration dampening, reduced weight, enhanced corrosion protection, decreased running noise, decreased maintenance and power use, and allow increased freedom of component design over non-polymeric components. Internal lubricants, such as polytetrafluoroethylene, graphite, molybdenum disulfide, and various oils and reinforcing fibers may be included in polymeric components to enhance wear resistance and decrease frictional losses. However, typical prior art internal lubricants may be costly and increase the complexity and number of processing steps.

The prior art discloses various modified polymers having improved sliding properties and increased wear resistance. For example, British Pat. No. 1403797 discloses a composition having improved compatibility of the polyamide and polyolefin components thereof. The composition comprises (a) at least one polyamide; (b) at least one olefin polymer; (c) at least one graft copolymer obtained by grafting an unsaturated dicarboxylic acid or the anhydride thereof, such as maleic anhydride, onto an olefin polymer, such as propylene or copolymers of propylene and ethylene; and (d) at least one compound selected from various carboxylic acids and anhydrides thereof.

U.S. Pat. No. 4,945,126 discloses lubricant systems in which a polyolefin or polyolefin/polytetrafluoroethylene blend functions as a lubricant in a polymer matrix material, providing desirable friction and wear properties to the resulting polymer composite. Suitable polyolefins include polyethylene, polypropylene and polyolefin copolymers.

U.S. Pat. No. 4,391,951 discloses a nylon 6 molding resin having increased wear life. The resin includes minor weight amounts of a polyolefin, a polyfluorocarbon and a polyester elastomer. The polyester elastomer is a block copolymer in which one component is an amorphous chain segment having a relatively low glass transition temperature.

SUMMARY OF THE INVENTION

According to the present invention, a method is provided for improving the wear resistance of a polymeric composite comprising a polyamide and a polypropylene. The polymeric composite is a component of a tribological wear system in which a surface of the polymeric composite bears against another surface causing friction and wear of the polymeric composite. The wear resistance of the composite is improved by melt mixing at least one crystalline polymer with the polyamide and polypropylene, the crystalline polymer being functionalized to graft with at least one of the polyamide and polypropylene to form the composite.

DETAILED DESCRIPTION OF THE PREFERRED EMBODIMENTS

The present method improves the wear resistance, crack propagation resistance, yield strength and transfer film ductility properties of a polyamide/polypropylene blend over typical prior art blends containing modifiers such as polytetrafluoroethylene or carbon or glass fibers. The present method, however, is less expensive and provides easier processing than typical methods of producing such prior art compositions.

The composition formed according to the present method may be used to fabricate contacting components for tribological systems, such as those typically found in machinery or household appliances. In a typical tribological wear system, the surface of a polymeric composite is brought to bear against a dry or unlubricated metallic surface, such as steel. For friction and wear testing of the composites formed according to the method of the present invention, steel having an average surface roughness $R_a$=12 to 16 μin. and a Rockwell hardness $R_c$=18 to 22 at room temperature (about 23° C.) was used as the metallic surface. Also, while components formed from the polymeric composition produced by the method of the present invention are preferably used under dry conditions, the components may also be used under wet conditions or in contact with a wide variety of materials such as other polymers, etc.

The primary wear mechanism of polymeric components in dry, smooth-contact tribological wear systems under moderate load conditions is adhesive wear. As the polymeric and metal components are brought into loaded moving (e.g., sliding) contact, the surface of the polymeric composite shears and spreads to form a polymeric film which becomes chemically attached to the surface of the metal component, i.e., a transfer film is formed on the surface of the metal component. The adhesive wear is influenced by two factors, namely the amount of work being done on the polymeric surface and the intrinsic durability of the sliding interface. The wear factor K, or rate of decay of the polymeric material surface, is determined by the rate of attrition and subsequent replacement of the transfer film as new layers of the surface of the polymeric material are abraded by sliding contact with the metal component.

The polymeric compositions prepared according to the present method may be used to form tribological wear components having high wear resistance (low wear factor), high crack propagation resistance and low yield strength for use in a wide variety of sliding components such as those discussed above. The high crack propagation resistance and low yield strength contribute to the high ductility of the transfer film formed on the surface of the components.

The polymeric composition prepared according to the present method comprises a blend of a polyamide and a polypropylene. Examples of suitable polyamides include nylon-4/6, nylon-6, nylon-6/6, nylon-6/10, nylon-6/12, nylon-11 and nylon-12. Examples of suitable polypropylenes include polypropylene homopolymer and polypropylene copolymers, such as a copolymer of polypropylene and polyethylene. The blend may also include other polymers such as polystyrenes, for example acrylonitrile-butadiene-styrene (ABS), styrene-acrylonitrile (SAN), and styrene-maleic anhydride (S-MA); polycarbonates; polyetherimides; polyolefins, such as polyethylene (PE) and polypropylene (PP); polysulfones; polyethersulfones (PES); polyacetals; polyesters, such as polyethylene terephthalate (PET), polybutylene terephthalate (PBT) and polycyclohexylene-dimethylene terephthalate (PCT); polyphenylene sulphides (PPS); polyphenylene oxides (PPO); and polyetheretherketones (PEEK). A preferred blend of polymers is the combination of nylon-6/6 with polypropylene or with a copolymer of polypropylene and polyethylene ("high impact polypropylene"). Polymer combinations may be selected to lessen the disadvantages and/or increase the advantages of particular polymers, such as decreasing warpage and cost or facilitating processing.

The weight ratio of the polyamide to the polypropylene should be about 5:95 to about 95:5. This ratio depends upon such factors as the choice of polymers to be blended, the physical characteristics of the individual polymers which are to be optimized or minimized, and the relative cost of each polymer. Preferably, the ratio is in the range of about 25:75 to about 75:25.

Optionally, up to about 10 wt % of the other polymers discussed above may be included in the blend. It is preferred that the other polymers of the blend are crystalline. Generally, crystalline polymers exhibit superior mechanical properties over non-crystalline polymers. Table 1 sets forth typical structures of some polymers useful in the method of the present invention.

TABLE 1

| Polymer | Structure |
|---|---|
| Polystyrenes | Amorphous |
| Polycarbonates | Amorphous |
| Polyetherimides | Amorphous |
| Polyolefins | Amorphous or crystalline |
| Polysulphones | Amorphous |
| Polyethersulphones | Amorphous |
| Polyacetals | Crystalline |
| Polyesters | Amorphous, Semi-crystalline, or crystalline |
| Polyphenylene sulphides | Semi-crystalline |
| Polyphenylene oxides | Amorphous |
| Polyetheretherketones | Crystalline |

The polymers may be blended or melt mixed in any suitable manner which will be evident to those of ordinary skill in the art. For example, the polymers may be in the form of powders or, more preferably, pellets. The polymers may be blended by static or screw/auger-type mixing, for example. Preferably the polymers are combined in a twin-screw compounding extruder such as are commercially available from Werner Pfleiderer or a Buss kneader from Buss (America), Inc. of Elk Grove Village, Ill.

The polymeric composite made according to the present method is a combination of the polymer blend discussed above and at least one crystalline polymer which is functionalized to graft with at least one of the polymers of the blend and thereby compatibilize the blend. Preferably, the crystalline polymer has a tensile modulus greater than about 100,000 p.s.i.

Examples of suitable functionalized crystalline polymers include maleic anhydride-modified polypropylene or polyethylene. One of ordinary skill in the art would understand that one or more functionalized crystalline polymers may be used in accordance with the present invention, as desired.

For example, in a nylon 6/6, PP and maleic anhydride-modified polypropylene composite, the maleic anhydride component of the modified PP grafts with the nylon polymer and the propylene component of the modified PP is compatible with the polypropylene. The functional group binds the polymers to increase the wear resistance and crack propagation resistance, lower the yield strength, and increase the ductility of the transfer film of the polymeric composite.

The functionalized crystalline polymers may, for example, be in the form of powders or pellets. The functionalized crystalline polymer may be added separately to the blended polymer pellets or all of the components may be blended simultaneously. The functionalized crystalline polymer should comprise about 2 to about 20 weight percent of the polymeric composite, and more preferably, about 5 to about 10 weight percent. The polymers may be combined by a twin-screw compounding extruder or Buss kneader, for example, to form the polymeric composite.

The polymeric composite of the present method may also include other additives, such as fillers, reinforcing agents, lubricants, coloring agents, heat stabilizers, ultraviolet light stabilizers and processing aids. Specific examples of such additives include carbon fiber, carbon powder, glass fiber, glass powder, glass beads, aramid fiber, polyethylene terephthalate fiber, stainless steel fiber, ceramic fiber, ceramic powder, wollastonite, talc clay, mica, pigments, stearates, waxes, polytetrafluoroethylene powder, molybdenun disulfide and various oils, including silicone oil.

The addition of glass fiber improves the creep resistance, thermal conductivity and reduces the heat distortion temperature of the composite. Carbon fiber may be added to the composite to increase strength, thermal conductivity, and creep and fatigue endurance. Other conventional additives for polymeric composites will be readily apparent to those of ordinary skill in the art.

Preferably, the additive is mixed with the polymeric composite after the polymers and functionalized crystalline polymer have been blended, although one of ordinary skill in the art would understand that all of the components may be blended together concurrently. The components may be blended in a conventional twin screw-extruder or a Buss kneader, such as those discussed above. The additives may comprise up to about 60 weight percent of the polymeric composite, depending upon the particular additive and properties desired.

The composites made according to the method of the present invention may be used in the same types of applications as other prior art composites, as where the surface of the composite bears against another surface, such as a metallic surface. The composites of the method of the present invention have similar or superior wear properties in such situations, including low wear factors.

By the present method, polymer blends may be created in which the advantages of individual polymer components offset disadvantages of other polymer components. For example, nylon processed alone is often susceptible to warpage. By combining polypropylene with nylon, warpage may be reduced or eliminated. However, a blend of nylon and polypropylene alone is often difficult to process. By including the functionalized crystalline polymer, the polyamide and polypropylene are compatibilized to improve processing and provide composites having increased wear resistance. Different polymers may be combined to form composites having enhanced physical properties, such as increased strength and temperature stability; decreased warpage; decreased cost; and simplified processing, such as decreased cycling time in molding operations.

The addition of one or more functionalized crystalline polymers to the polymer blend provides composites which have higher resistance to crack propagation and lower yield strength, as well as increased wear resistance and ductility of the transfer film formed as a result of sliding friction between such composites and contacting surfaces of other components.

The present invention will now be illustrated in more detail by reference to the following specific, non-limiting examples. Unless otherwise indicated, all percentages are by weight.

EXAMPLE

Nylon 6/6 and polypropylene (PP) composites were prepared by blending varying percentages of nylon 6/6 (Zytel 101, available from the E. I. du Pont de Nemours of Wilmington, Del.) and (1) high impact polypropylene copolymer (Profax 8623, available from Himont of Wilmington, Del.) having about 6 wt % polyethylene incorporated therein or (2) polypropylene homopolymer (Bamberger 4042 available from Bamberger of New Brunswick, N.J.). Varying percentages of a functionalized crystalline polymer, namely maleic anhydride-modified polypropylene homopolymer ("MA-PP") pellets were hand blended with the various polymer blends to form compositions of the present invention. The MA-PP pellets had a melt flow of 230 g/10 min at 230° C. and 2.16 kg weight average molecular weight of $6.6 \times 10^4$ grams/mole, a total acid content of 0.55 wt % and 0.9 moles of acid per chain. Polytetrafluoroethylene (PTFE) powder (Witcon™ TL-156, available from ICI Americas, Inc. of Wilmington, Del.), a typical prior art modifier, was hand blended in different proportions with similar polymer blends for comparison with the test compositions of the present invention. Glass fiber ("GF") (⅛" Schuller, available from Schuller of Toledo, Ohio) was hand blended with several of the present and prior art polymer compositions. The compositions were extruded in a Werner Pfleiderer ZSK-40™ twin screw-extruder. The percentages of each component for each composite are set forth in Table 2.

The extrudate was comminuted into pellets and injection molded into thrust washers for wear testing. The friction and wear testing of each specimen were determined according to the thrust washer dry sliding wear test method. Wear factors (volumetric weight loss measured in units of $10^{-16}$ meter$^3$/Newton meter (m$^3$/Nm)) for each composite were based on equilibrium wear rates independent of break-in wear. The wear test was conducted at a contact pressure of 40 p.s.i. and a test speed of 50 feet/minute at room temperature (about 23° C.) against a mating metal surface of cold rolled carbon steel (Rockwell hardness of 18 to 22). The average surface roughness ($R_a$) of the rotating hard metallic disc was 12 to 16 μin. After thermal equilibrium was established, the mass loss was determined at intervals of 24 hours until a steady state condition was obtained over at least six periods of the mass loss measurements. The results of the friction and wear testing are set forth in Table 2. Each result is the mean average of four test runs conducted under the same test conditions.

The results indicate that a substantial improvement in wear resistance is achieved by the composites made according to the method of the present invention for nylon 6/6-polypropylene blends over nylon 6/6 alone or nylon 6/6-PP blends including a typical prior art additive, such as polytetrafluoroethylene.

Run No. 1 shows that a composition consisting of 100% nylon 6/6 has a wear factor of $114 \times 10^{-16}$ m$^3$/Nm and a coefficient of kinetic friction of 0.20. Replacing 20% of the nylon 6/6 with PTFE (Run No. 7) lowered the wear factor to $6.8 \times 10^{-16}$ m$^3$/Nm and the coefficient of kinetic friction to 0.18. An 80/20 blend of polypropylene homopolymer/PTFE (Run No. 8) has a wear factor of $18.8 \times 10^{-16}$ m$^3$/Nm and a coefficient of kinetic friction of 0.11.

TABLE 2

| Run No. | Composition (Weight Percent) | | | | | | Wear Factor ($\times 10^{-6}$ m$^3$/NM) | Coefficient of Kinetic Friction (μ) |
| | Nylon 6/6 | PP homopolymer | High-Impact PP | MA-PP | PTFE | Glass Fiber | | |
| --- | --- | --- | --- | --- | --- | --- | --- | --- |
| 1 | 100 | — | — | — | — | — | 114.0 | 0.20 |
| 2 | 47.5 | — | 47.5 | 5 | — | — | 3.5 | 0.12 |
| 3 | 57.5 | — | 37.5 | 5 | — | — | 4.7 | 0.15 |
| 4 | 68 | 28 | — | 5 | — | — | 69.5 | — |
| 5 | 79 | 18 | — | 5 | — | — | 110.6 | — |
| 6 | 57.5 | 37.5 | — | 5 | — | — | 27 | 0.16 |
| 7 | 80 | — | — | — | 20 | — | 6.8 | 0.18 |
| 8 | — | 80 | — | — | 20 | — | 18.8 | 0.11 |
| 9 | — | 55 | — | — | 15 | 30 | 28.1 | 0.35 |
| 10 | 40.5 | — | 26 | 3.5 | — | 30 | 33 | 0.16 |
| 11 | 33.25 | — | 33.25 | 3.5 | — | 30 | 23 | 0.16 |
| 12 | 40.5 | 26 | — | 3.5 | — | 30 | 46.7 | 0.26 |

Significantly, a blend according to the present invention of 47.5% nylon 6/6, 47.5% high-impact propylene copolymer and 5% MA-PP (Run No. 2) provides a composite having superior wear resistance than the prior art blends previously discussed. More specifically, the coefficient of kinetic friction of the blend of Run No. 2 is about 0.12 and the wear factor, $3.5 \times 10^{-16}$ m$^3$/Nm, is significantly less than that obtained by addition of PTFE or PTFE and glass fiber to a nylon 6/6 or polypropylene composition. It is believed that MA-PP acts as a compatibilizer to lessen the wear factor, increase crack propagation resistance and increase the ductility of the transfer film of the polymeric composites of the present invention due to bonding of the functionalized maleic anhydride portion of the MA-PP to the polypropylene.

It is also believed that the use of high-impact polypropylene in the composite of Run No. 2 enhanced the wear improving effect of the functionalized crystalline polymer. This belief is supported by a comparison of the composites of Run Nos. 3 and 6, which differed only in the type of polypropylene used in each composite. In Run No. 3, a blend according to the present invention of 57.5% nylon 6/6, 37.5% high-impact polypropylene and 5% MA-PP provided a composite having a wear factor of $4.7 \times 10^{-16}$ m$^3$/Nm and a coefficient of kinetic friction of 0.15. In Run No. 6, polypropylene homopolymer was used instead of high-impact polypropylene. The wear factor of the composite of Run No. 6 was $27 \times 10^{-16}$ m$^3$/Nm and the coefficient of kinetic friction was 0.16. The significantly lower wear factor for the composite of Run No. 3 versus that of Run No. 6 indicates that the high-impact polypropylene enhances the wear improving effect of the functionalized crystalline polymer.

Regardless of whether polypropylene homopolymer or copolymer was used, each of the examples of the composites made according to the method of the present invention have coefficients of kinetic friction well below those of nylon 6/6 or standard polypropylene blends alone or including a typical prior art additive PTFE. The wear factors for composites of the present invention using high-impact PP (Runs Nos. 2 and 3) are less than the wear factors for composites using PTFE (Run Nos. 7–9). Even when large percentages of glass fiber (30%) were included in composites of the present invention (Run Nos. 10–12), the coefficients of kinetic friction for each of these composites were less than those of a composite including a greater percentage of PTFE and glass fiber (see Run No. 9).

Typically, nylon is about twice as expensive as polypropylene. While nylon is subject to less warpage than polypropylene, it can be difficult to process. A blend of nylon and polypropylene counterbalances these drawbacks and provides less expensive composites having less warpage and better molding characteristics than either polymer alone. However, a blend of nylon and polypropylene alone has insufficient strength and wear resistance for increasingly demanding tribological applications. Conventional prior art additives which may decrease wear resistance, such as PTFE, are often prohibitively expensive. Therefore, the present method of combining a blend of nylon 6/6 and PP with a functionalized crystalline polymeric compatibilizer, such as MA-PP, to provide increased, wear resistance and high crack propagation resistance at reasonable cost represents a significant breakthrough in the tribological art.

According to the method of the present invention, relatively expensive polymers are combined with less expensive polymers to form composites having similar or improved wear resistance and lower crack propagation than prior art composites. Mixtures of different polymers permit optimization of physical characteristics of the resulting composite, such as strength, warpage, temperature stability and processing ease. Traditional prior art additives are often costly and, as in the case of glass fiber, may require additional processing steps. The present invention provides compatibilized polymeric compositions having similar or superior wear properties to prior art polymeric compositions at reduced cost, thereby fulfilling a long-felt need in the art.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the invention as defined by the appended claims.

I claim:

1. A method of improving the wear resistance and adhesive wear properties of a polymeric composite in a dry, smooth contact sliding tribological wear system wherein a surface of said polymeric composite bears against another surface causing friction and adhesive wear of said polymeric composite, the method comprising the steps of:

a) providing a blend of a polyamide and a polypropylene selected from the group consisting of homopolymers and copolymers of propylene;

b) providing to the blend a maleic-anhydride modified polypropylene functionalized to graft with the polyamide in the blend and compatible with the polypropylene in the blend; and c) melt-mixing the maleic-anhydride modified polypropylene with the blend to form a polymeric composite consisting essentially of the blend and the maleic anhydride-modified polypropylene, wherein the maleic anhydride-modified polypropylene in the composite is grafted to the polyamide such that the wear resistance of the polymeric composite is greater than a wear resistance of the blend in the tribological system.

2. A method according to claim 1, wherein said polyamide is selected from the group consisting of nylon-4/6, nylon-6, nylon-6/6, nylon-6/10, nylon-6/12, nylon-11 and nylon-12.

3. A method according to claim 1, wherein the ratio of said polyamide to said polypropylene is about 5:95 to about 95:5.

4. A method according to claim 3, wherein the ratio of said polyamide to said polypropylene is about 25:75 to 75:25.

5. A method according to claim 1, wherein said maleic-anhydride modified polypropylene comprises about 2 to about 20 weight percent of said composite.

6. A method according to claim 1, wherein said maleic-anhydride modified polypropylene has a tensile modulus greater than about 50,000 p.s.i.

7. The method according to claim 1, wherein the wear factor of the polymeric composite is no greater than $110.6 \times 10^{-16}$ m$^3$/Nm.

8. A dry, smooth contact sliding tribological wear system comprising a first surface and a second surface, said second surface being formed of a polymeric composite and positioned to bear against said first surface in said tribological system to cause friction and adhesive wear, said polymeric composite consisting essentially of (i) a blend of a polyamide and a polypropylene selected from the group consisting of homopolymers and copolymers of propylene, and (ii) a maleic-anhydride modified polypropylene functionalized to graft with said polyamide in said blend and compatible with said polypropylene in said blend, said maleic anhydride-modified polypropylene in said composite being grafted to said polyamide such that the wear resistance of said polymeric composite in said tribological system is greater than the wear resistance of said blend in a tribological system comprising said blend and said first surface.

9. The tribological system of claim 8, wherein the wear factor of said polymeric composite in said system is no greater than $110.6 \times 10^{-16}$ m$^3$/Nm.

* * * * *